United States Patent
Li et al.

[11] Patent Number: 5,832,046
[45] Date of Patent: Nov. 3, 1998

[54] TIMING TRACKING IN COMMUNICATIONS SYSTEMS

[75] Inventors: Yong Li, Kanata; Rui Wang, Ottawa, both of Canada; Iouri Trofimov, Moskva, Russian Federation; Alexandre Chloma; Mikhail Bakouline, both of Moskovskaja oblast, Russian Federation; Vitali Kreindeline, Moskva, Russian Federation

[73] Assignee: Northern Telecom Limited, Montreal, Canada

[21] Appl. No.: 681,473

[22] Filed: Jul. 23, 1996

Related U.S. Application Data

[60] Provisional application No. 60/010,576, Jan. 25, 1996.

[51] Int. Cl.[6] .................................................. H04L 7/00
[52] U.S. Cl. ........................................ 375/355; 375/326
[58] Field of Search ................................. 375/326, 346, 375/348, 350, 355; 364/724.1

[56] References Cited

U.S. PATENT DOCUMENTS

| 5,199,047 | 3/1993 | Koch | 375/231 |
|---|---|---|---|
| 5,432,816 | 7/1995 | Gozzo | 375/232 |
| 5,440,588 | 8/1995 | Murakami | 375/341 |
| 5,654,989 | 8/1997 | Gurney et al. | 375/355 |
| 5,694,440 | 12/1997 | Kallman et al. | 375/355 |
| 5,710,792 | 1/1998 | Fukawa et al. | 375/229 |

Primary Examiner—Young T. Tse
Attorney, Agent, or Firm—Foley & Lardner

[57] ABSTRACT

In a TDMA cellular communications system, optimal sampling of symbols in an information sequence is maintained by a method of timing tracking in which, recursively, indirect variables of a linear complex vector are estimated from received samples and previous estimates of the indirect variables, the sampling delay, and a complex fading factor, and the complex fading factor and the sampling delay are estimated by non-linear transformations of the estimated indirect variables. The timing tracking follows a timing recovery process which produces initial estimates. An implementation of the method uses a Kalman filter having constant filter gains and a transformation of the received samples and sampling delay to a reduced time interval.

9 Claims, 2 Drawing Sheets

TIMING TRACKING IN COMMUNICATIONS SYSTEMS

This application claims the benefit of United States Provisional Application No. 60/010,576 filed Jan. 25, 1996.

CROSS-REFERENCE TO RELATED APPLICATIONS

Reference is directed to U.S. patent application Ser. No. 08/688,911, filed on Jul. 31, 1996 by Yong Li et al. entitled "Timing Recovery And Frame Synchronization In Communications Systems", claiming the benefit of United States Provisional Applications No. 60/002,708 filed Aug. 23, 1995 and No. 60/005,819 filed Oct. 23, 1995. The entire disclosure of each of these applications is hereby incorporated herein by reference.

BACKGROUND OF THE INVENTION

This invention relates to timing tracking in communications systems. Timing tracking refers to the maintenance of accurate timing, for recovering data from a received communications signal, after initial timing recovery.

The invention is applicable to communications systems generally, and is especially applicable to, and is described below in the context of, a TDMA (time division multiple access) cellular communications system compatible with EIA/TIA document IS-54-B: Cellular System Dual-Mode Mobile Station—Base Station Compatibility Standard (Rev. B). For convenience and brevity, such a system is referred to below simply as an IS-54 system.

In an IS-54 system, data is communicated in time slots each comprising 162 symbols which include a sync (synchronization) word of 14 symbols followed by an information sequence. The sync word is used among other things to facilitate timing recovery, i.e. to determine an optimum time for sampling the received signal for further processing to recover the communicated information. It is well known that timing recovery and the necessary processing of the samples are made more difficult by a low signal-to-noise ratio (SNR), and that a low SNR can often be present in cellular communications systems.

Various methods are known for performing timing recovery, and the present invention can be applied regardless of the particular method of timing recovery which is used. Particularly advantageous methods of timing recovery are described in the related applications referred to above.

After determination of an initial optimum sampling time through timing recovery using the sync word, it is desirable to maintain optimum sampling times throughout the following information sequence. This is referred to as timing tracking, and serves to avoid cumulative errors of the sampling times during the information sequence, which if not corrected can detract from the recovery of the communicated information. In the following description, the sampling delay refers to the period between the optimal and actual sampling times of the received signal. In practice, the sampling delay can be used to adjust the actual sampling times or, equivalently, to control an interpolator to which the actual samples are supplied to obtain interpolated samples at the optimal sampling times.

An object of this invention is to provide a desirable method of timing tracking in a communications system.

SUMMARY OF THE INVENTION

The invention provides a method of tracking a sampling delay for samples of an information sequence in a received communications signal, comprising the steps of, recursively:

providing a current estimate of indirect variables of a linear complex vector, which approximates received signal samples, from received samples and previous estimates of the indirect variables, the sampling delay, and a complex fading factor; and providing current estimates of the complex fading factor and of the sampling delay by performing respective non-linear transformations of the current estimate of the indirect variables.

Preferably the step of providing a current estimate of the indirect variables comprises the steps of:

demodulating received samples in dependence upon the previous estimate of the complex fading factor and a stored vector dependent upon the previous estimate of the sampling delay, to produce estimated symbols of the information sequence;

modifying the received samples in dependence upon the estimated symbols to produce modified samples; and Kalman filtering the modified samples to produce the current estimate of the indirect variables.

The step of Kalman filtering conveniently uses a one-dimensioned Kalman filter having constant filter gains.

The method preferably further includes the step of transforming the received samples and the estimates of the sampling delay from an interval from $-T/2$ to $T/2$ to an interval from $-T/4$ to $T/4$, where T is a symbol spacing of the information sequence, wherein the current estimates are provided with the sampling delay reduced to the interval from $-T/4$ to $T/4$.

The invention also provides apparatus for tracking a sampling delay for sampling an information sequence in a received communications signal, comprising:

a demodulator, responsive to received signal samples and to estimates of the sampling delay and a complex fading factor of the received communications signal, to estimate symbols of the information sequence;

a calculation unit responsive to the estimated symbols to update an observation model for the received communications signal;

a Kalman filter responsive to the observation model to update an estimated linear complex vector which approximates the received signal samples; and a non-linear transform unit responsive to the estimated linear complex vector to produce updated estimates of the sampling delay and complex fading factor for use recursively by the demodulator.

BRIEF DESCRIPTION OF THE DRAWINGS

The invention will be further understood from the following description with reference to the accompanying drawings, in which.

DETAILED DESCRIPTION

Figure 1:
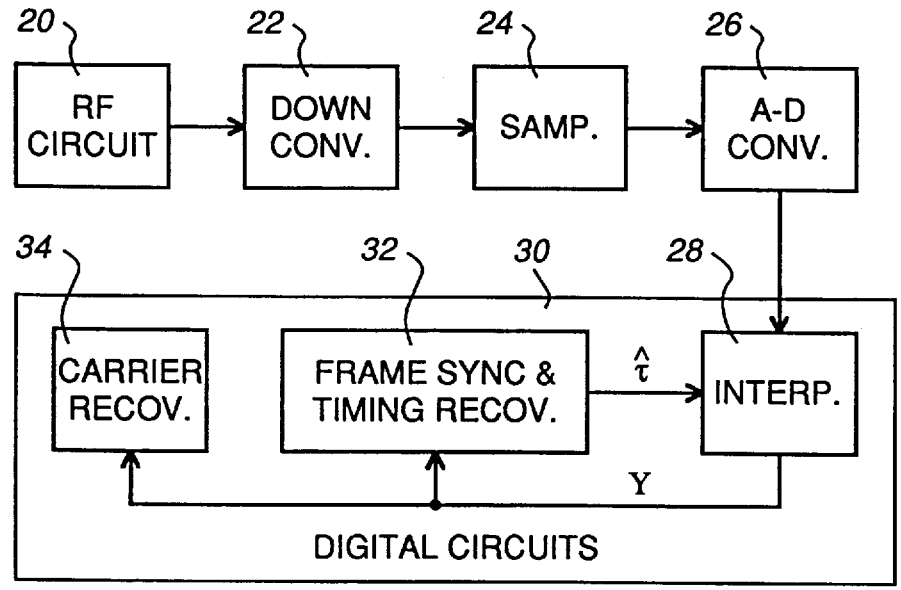
FIG. 1 schematically illustrates a block diagram of parts of a wireless digital communications receiver.

The following description initially presents, by way of example, signal and observation models for an IS-54 system, followed by a description of procedures which can be used in accordance with the method of the invention. A physical implementation of a timing tracking arrangement in accordance with the invention is then described in detail with reference to FIGS. 1 and 2 of the drawings. This arrangement makes use of initial estimates which can be produced by timing recovery. A timing recovery method which may be particularly suitable for producing these estimates is described in mathematical terms and then in its physical arrangement with reference to FIGS. 3 and 4. It should be appreciated, however, that other arrangements may be provided for producing the initial estimates used in accordance with this invention. In addition, although the detailed description relates specifically to an IS-54 system, it is emphasized that this is by way of example and that the invention is applicable to other communications systems.

Signal and Observation Models

An IS-54 -B system uses π/4—shifted DQPSK (differential quadrature phase shift keyed) signal symbols which can be described by $$s_k = s_{k-1} \cdot w_k, \quad w_k = (\theta_k + j\upsilon_k)/\sqrt{2}, \quad k = 1, 2, 3, \ldots \quad (1)$$

where k is a positive integer identifying the symbol $s_k$, $w_k$ is a complex value, representing binary information, with real and imaginary parts $\theta_k$ and $\upsilon_k$ respectively, $\theta_k, \upsilon_k \in \{-1,1\}$ (i.e. each of $\theta_k$ and $\upsilon_k$ is one of the set of values −1 and 1, i.e. is either −1 or 1); and $|s_k|=1$ for any k (i.e. the amplitude of $s_k$ is 1).

With sampling as is usual at twice the symbol rate, a discrete observation model of the received signal samples has the form:

$$y_{e,k} = A_k s_k g(\tau_k) + A_k \Sigma_{i-1}^2 (s_{k-i} g(iT+\tau_k) + s_{k+i} g(-iT+\tau_k)) + \eta_{e,k} \quad (2)$$

$$y_{o,k} = A_k s_k g(\tau_k^\bullet) + A_k \Sigma_{i-1}^2 (s_{k-i} g(iT+\tau_k^\bullet) + s_{k+i} g(-iT+\tau_k^\bullet)) + \eta_{o,k} \quad (3)$$

where $y_{e,k}$ and $y_{o,k}$ are the first and second complex signal samples in a symbol space k (the suffixes e and o referring to even and odd), i is an integer from 1 to 2, T is the symbol spacing, $\tau_k$ is the sampling delay in the symbol space k, $\tau_k^\bullet = T/2 + \tau_k$, $A_k$ is an unknown complex fading factor, g(t) is the impulse response of the channel filters (the transmit and receive filters combined) given by $$g(t) = \left(\frac{\sin(\pi t/T)}{\pi t/T}\right)\left(\frac{\cos(\alpha \pi t/T)}{(1 - (2\alpha t/T^2))}\right)$$

where α is the filter roll-off coefficient, and $\eta_{e,k}$ and $\eta_{o,k}$ are complex Gaussian random variables with zero mean, variance $2\sigma_\eta$, and correlation characteristics given by:

$$E\{\eta_{o,k}\eta'_{o,n}\} = E\{\eta_{e,k}\eta'_{e,n}\} = 2\sigma_\eta^2 g((k-n)T) \quad (4)$$

$$E\{\eta_{e,k}\eta'_{o,n}\} = 2\sigma_\eta^2 g\left((k-n)T - \frac{T}{2}\right) \quad (5)$$

where n is an integer and the prime symbol ' indicates the conjugate transpose.

Timing Tracking Method

The timing tracking method selves recursively to provide estimates (estimated values are denoted by a circumflex symbol ^) of the sampling delay $\tau_k$ and the complex fading factor $A_k$ during the information sequence of data symbols in a time slot, indexed by values of the integer k from 1 to N, starting with initial estimates $\hat{\tau}_0$ and $\hat{A}_0$ provided by a timing recovery method for example as described below or in any other convenient manner.

Each estimation is performed in two recursive stages. Firstly, the observation model given by equations (2) and (3) is approximated by updating an estimate of a linear vector $\Phi_k$ containing indirect variables which embody information as to the sampling delay $\tau_k$. An initial estimate $\hat{\Phi}_0$ of this vector is also provided by the timing recovery method as described below or in any other convenient manner. Secondly, updated estimates of the sampling delay and complex fading factor are recovered from the estimated indirect variable vector, using a nonlinear transformation.

With [ ]$^T$ representing the conjugate transpose of the matrix within the square brackets, the indirect variable vector is defined by:

$$\Phi_k = \left[A_k g(\tau_k), A_k g\left(\frac{T}{2}+\tau_k\right), A_k g\left(\frac{T}{2}-\tau_k\right)\right]^T \quad (6)$$

To estimate this, it is necessary first to estimate the symbol $s_k$. For this purpose, it is assumed that the sampling delay $\tau_k$ and the complex fading factor $A_k$ are both known. In practice, the previous estimates $\hat{\tau}_{k-1}$ and $\hat{A}_{k-1}$ of these variables are used as is further described below.

Using the following definitions:

$$W_k = [s_{k-4}, s_{k-3}, \ldots s_{k+4}]^T \quad (7)$$

$$Y_k = [y_{e,k-2}, y_{o,k-2}, y_{e,k-1}, y_{o,k-1}, \ldots y_{e,k+1}, y_{o,k+1}, y_{e,k+2}]^T \quad (8)$$

$$\eta_k = [\eta_{e,k-2}, \eta_{o,k-2}, \eta_{e,k-1}, \eta_{o,k-1}, \ldots \eta_{e,k+1}, \eta_{o,k+1}, \eta_{e,k+2}]^T \quad (9)$$

gives, from equations (2) and (3), the equation:

$$Y_k = A_k G(\tau_k) W_k + \eta_k \quad (10)$$

where $G(\tau)$ is a channel impulse response matrix defined by:

$$G(\tau) = \begin{vmatrix} m0 & m2 & m4 & m6 & m8 & 0 & 0 & 0 & 0 \\ m1 & m3 & m5 & m7 & m9 & 0 & 0 & 0 & 0 \\ 0 & m0 & m2 & m4 & m6 & m8 & 0 & 0 & 0 \\ 0 & m1 & m3 & m5 & m7 & m9 & 0 & 0 & 0 \\ 0 & 0 & m0 & m2 & m4 & m6 & m8 & 0 & 0 \\ 0 & 0 & m1 & m3 & m5 & m7 & m9 & 0 & 0 \\ 0 & 0 & 0 & m0 & m2 & m4 & m6 & m8 & 0 \\ 0 & 0 & 0 & m1 & m3 & m5 & m7 & m9 & 0 \\ 0 & 0 & 0 & 0 & m0 & m2 & m4 & m6 & m8 \end{vmatrix}$$

where the matrix elements are defined as m0=g(2T+τ), m2=g(T+τ), m4=g(τ), m6=g(T−τ), m8=g(2T−τ), m1=$(5^T/_2+$τ), m3=$(3^T/_2+$τ), m5=$(^T/_2+$τ), m7=$(^T/_2-$τ), and m9=$(3^T/_2-$τ). In equation (10) it is assumed for analytical convenience that the complex fading factor amplitudes $A_i$ are all equal in the range for the integer i from k−2, and that the sampling delays $\tau_i$ are all equal in the range for the integer i from k−4 to k+4.

Applying the least-mean-square method gives an optimal estimation of $W_k$ as:

$$\hat{W}_k = \frac{1}{A_k} Q(\tau_k) Y_k \tag{11}$$

where $$Q(\tau_k) = (G^T(\tau_k) B^{-1} G(\tau_k))^{-1} G^T(\tau_k) B^{-1}$$

and $$B = cov<\eta_k \cdot \eta_k^T> = 2\sigma_\eta^2 \cdot \begin{vmatrix} 1 & g\left(\frac{T}{2}\right) & 0 & g\left(\frac{3T}{2}\right) & 0 & g\left(\frac{5T}{2}\right) & 0 & g\left(\frac{7T}{2}\right) & 0 \\ g\left(\frac{T}{2}\right) & 1 & g\left(\frac{T}{2}\right) & 0 & g\left(\frac{3T}{2}\right) & 0 & g\left(\frac{5T}{2}\right) & 0 & g\left(\frac{7T}{2}\right) \\ 0 & g\left(\frac{T}{2}\right) & 1 & g\left(\frac{T}{2}\right) & 0 & g\left(\frac{3T}{2}\right) & 0 & g\left(\frac{5T}{2}\right) & 0 \\ g\left(\frac{3T}{2}\right) & 0 & g\left(\frac{T}{2}\right) & 1 & g\left(\frac{T}{2}\right) & 0 & g\left(\frac{3T}{2}\right) & 0 & g\left(\frac{5T}{2}\right) \\ 0 & g\left(\frac{3T}{2}\right) & 0 & g\left(\frac{T}{2}\right) & 1 & g\left(\frac{T}{2}\right) & 0 & g\left(\frac{3T}{2}\right) & 0 \\ g\left(\frac{5T}{2}\right) & 0 & g\left(\frac{3T}{2}\right) & 0 & g\left(\frac{T}{2}\right) & 1 & g\left(\frac{T}{2}\right) & 0 & g\left(\frac{3T}{2}\right) \\ 0 & g\left(\frac{5T}{2}\right) & 0 & g\left(\frac{3T}{2}\right) & 0 & g\left(\frac{T}{2}\right) & 1 & g\left(\frac{T}{2}\right) & 0 \\ g\left(\frac{7T}{2}\right) & 0 & g\left(\frac{5T}{2}\right) & 0 & g\left(\frac{3T}{2}\right) & 0 & g\left(\frac{T}{2}\right) & 1 & g\left(\frac{T}{2}\right) \\ 0 & g\left(\frac{7T}{2}\right) & 0 & g\left(\frac{5T}{2}\right) & 0 & g\left(\frac{3T}{2}\right) & 0 & g\left(\frac{T}{2}\right) & 1 \end{vmatrix}$$

The symbol $s_k$ is estimated using the central element of the vector $\hat{W}_k$:

$$\hat{s}_k = \hat{W}_k(5) = \frac{1}{A_k} Q_5(\tau_k) Y_k \tag{12}$$

where $Q_5(\tau_k)$ is the fifth row of the matrix $Q(\tau_k)$. For different possible values of $|\tau| \leq T$ (separated by a predetermined convenient spacing) the vector $Q_5(\tau)$ can be calculated in advance of other processing and stored in a memory for subsequent look-up.

This estimation $\hat{s}_k$ enables a modified observation model to be obtained:

$$\tilde{y}_{e,k} = y_{e,k} \cdot \hat{s}'_k \tag{13}$$

$$\tilde{y}_{o,k} = y_{o,k} \cdot \hat{s}'_k \tag{14}$$

$$\tilde{y}_{o,k,1} = y_{o,k} \cdot \hat{s}'_{k+1} \tag{15}$$

where the prime symbol ' again indicates the conjugate transpose (in this case the complex conjugate because $\hat{s}_k$ is a scalar).

In equations (2) and (3), assuming that $s_k = \hat{s}_k$ and $s_{k+1} = \hat{s}_{k+1}$, then equations (13) to (15) can be rewritten as:

$$\tilde{y}_{e,k} = A_k g(\tau_k) + ISI_{e,k} + \tilde{\eta}_{e,k} \tag{16}$$

$$\tilde{y}_{o,k} = A_k g\left(\frac{T}{2} + \tau_k\right) + ISI_{o,k} + \tilde{\eta}_{o,k} \tag{17}$$

$$\tilde{y}_{o,k,1} = A_k g\left(\frac{T}{2} - \tau_k\right) + ISI_{o,k,1} + \tilde{\eta}_{o,k,1} \tag{18}$$

where ISI represents an inter-symbol interference term and $\eta$ represents a noise term.

The equations (16) to (18) can be rewritten as:

$$\tilde{y}_{e,k} = \phi_k(1) + v_{1,k} \tag{19}$$

$$\tilde{y}_{o,k} = \phi_k(2) + v_{2,k} \tag{20}$$

$$\tilde{y}_{o,k,1} = \phi_k(3) + v_{3,k} \tag{21}$$

where $\phi_k(1)$, $\phi_k(2)$, and $\phi_k(3)$ are the variables of the vector $\Phi_k$ and $v_{1,k}$, $v_{2,k}$, and $v_{3,k}$ are terms combining channel noise and interference. Assuming for simplicity that $v_{1,k}$, $v_{2,k}$, and $v_{3,k}$ are not correlated either in time or between one another, a recursive algorithm for the estimation of $\phi_k(1)$, $\phi_k(2)$, and $\phi_k(3)$ based on a one-dimensioned Kalman filter is obtained as follows:

$$\hat{\phi}_k(1) = \hat{\phi}_{k-1}(1) + K_{k-1}(1)(\tilde{y}_{e,k} - \hat{\phi}_{k-1}(1)) \tag{22}$$

$$\hat{\phi}_k(2) = \hat{\phi}_{k-1}(2) + K_{k-1}(2)(\tilde{y}_{e,k} - \hat{\phi}_{k-1}(2)) \tag{23}$$

$$\hat{\phi}_k(3) = \hat{\phi}_{k-1}(3) + K_{k-1}(3)(\tilde{y}_{o,k,1} - \hat{\phi}_{k-1}(3)) \tag{24}$$

where $K_{k-1}(1)$, $K_{k-1}(2)$, and $K_{k-1}(3)$ are Kalman filter gains.

In the physical implementation of the invention as described below, it is assumed for simplicity that these Kalman filter gains do not vary with the value of k but are constants K(1), K(2), and K(3) respectively. This simplification makes it unnecessary to calculate these gains for each successive symbol (value of k). Desired values of these gains can be chosen by simulation; in an implementation of the invention as described below these constant values were chosen as K(1)=K(2)=K(3)=0.08.

Having determined an estimate $\hat{\Phi}_k$ of the indirect variable vector as described above, the following non-linear trans forms are applied to obtain updated estimates $\hat{\tau}_k$ of the sampling delay and $\hat{A}_k$ of the complex fading factor:

$$\hat{\tau}_k = \begin{cases} \psi\left(\dfrac{|\hat{\phi}_k(1) \cdot \hat{\phi}'_k(2)|}{|\hat{\phi}_k(1)|^2}\right) & \hat{\tau}_{k-1} \leq 0 \\ -\psi\left(\dfrac{|\hat{\phi}_k(1) \cdot \hat{\phi}'_k(3)|}{|\hat{\phi}_k(1)|^2}\right) & \hat{\tau}_{k-1} > 0 \end{cases} \quad (25)$$

$$\hat{A}_k = \begin{cases} \dfrac{\hat{\phi}_k(1) \cdot g(\hat{\tau}_k) + \hat{\phi}_k(2) \cdot g\left(\dfrac{T}{2} + \hat{\tau}_k\right)}{g^2(\hat{\tau}_k) + g^2\left(\dfrac{T}{2} + \hat{\tau}_k\right)} & \hat{\tau}_k \leq 0 \\ \dfrac{\hat{\phi}_k(1) \cdot g(\hat{\tau}_k) + \hat{\phi}_k(3) \cdot g\left(\dfrac{T}{2} - \hat{\tau}_k\right)}{g^2(\hat{\tau}_k) + g^2\left(\dfrac{T}{2} - \hat{\tau}_k\right)} & \hat{\tau}_k > 0 \end{cases} \quad (26)$$

where $\psi(\lambda)$ is the inverse function of:

$$\lambda = \frac{g\left(\dfrac{T}{2} + \tau\right)}{g(\tau)} \quad (27)$$

A suitable approximation for $\psi(\lambda)$ is:

$$\tau = \psi(\lambda) \approx \frac{T}{2} - a\tan\left(\frac{\lambda}{1.1}\right) \quad -0.9T \leq \tau \leq 0.9T \quad (28)$$

Physical Implementation

Referring now to the drawings, FIG. 1 illustrates in a block diagram parts of a wireless digital communications receiver, in which a wireless digital communications signal is supplied via an RF (radio frequency) circuit 20 of a receiver to a down converter 22 to produce a signal which is sampled by a sampler 24, the samples being converted into digital form by an A-D (analog-to-digital) converter 26. The digitized samples are interpolated by an interpolator 28 in accordance with a recovered estimated sampling delay $\hat{\tau}$ to produce samples Y, at estimated optimal sampling times, for further processing. As an alternative to the provision of the interpolator 28, the estimated sampling delay $\hat{\tau}$ could be used directly to control the sampling time of the sampler 24. The interpolator 28 forms part of digital circuits 30, conveniently implemented in a DSP (digital signal processor) integrated circuit, which also include a timing recovery and frame synchronization block 32 which produces the estimated sampling delay $\hat{\tau}$ as described below, and a carrier recovery block 34 which is not described further here. The samples Y from the interpolator 28 are supplied as the input signal to the blocks 32 and 34.

The block 32 performs the functions of timing recovery, for example as described later below, and timing tracking using the procedures as described above, and desirably combines with these the functions of frame synchronization as described in the related applications referred to in the introduction. Alternatively, any necessary frame synchronization can be performed separately. It is assumed here that the resulting sampling delay $\tau$ is within the interval from −T/2 to T/2.

Timing Tracking

Figure 2:
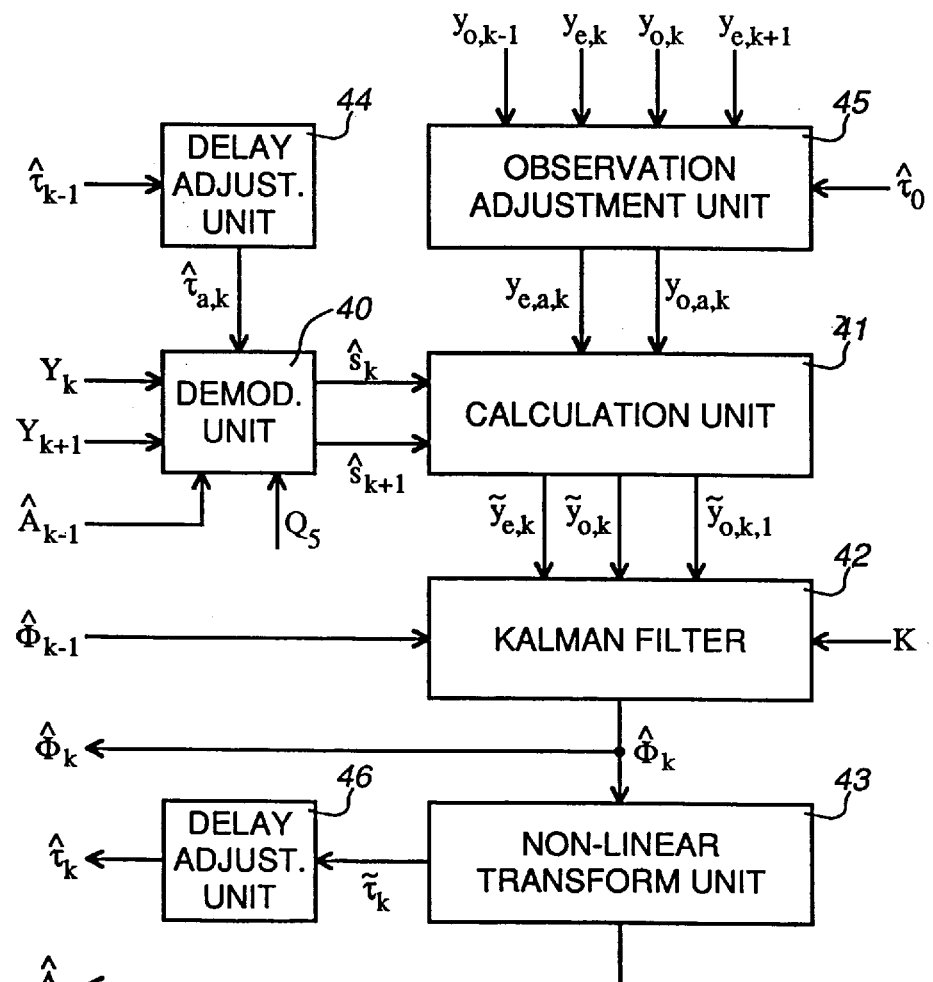
FIG. 2 illustrates a block diagram of a timing tracking arrangement in accordance with this invention.

FIG. 2 illustrates a block diagram of an implementation of the timing tracking parts of the block 32. The arrangement comprises a demodulation unit 40, a calculation unit 41, a Kalman filter 42, and a non-linear transform unit 43 which produce the estimates in accordance with the method described above. In order to improve the estimation process, the arrangement further comprises an input sampling delay adjustment unit 44, an observation adjustment unit 45, and an output sampling delay adjustment unit 46 which operate as described below. All of these units are preferably implemented as functions of a DSP as discussed above.

The units of the arrangement in FIG. 2 operate recursively to produce the estimates $\hat{\Phi}_k$, $\hat{A}_k$, and $\hat{\tau}_k$ for each symbol k of the information sequence from preceding estimates for the symbol k−1 and the received samples. For the first received data symbol, for which k =1, the estimates $\hat{\Phi}_0$, $\hat{A}_0$, and $\hat{\tau}_0$ are those produced by the timing recovery method an example of which is described later below.

The observation adjustment unit 45 serves to produce adjusted (denoted by a suffix a) even and odd samples $Y_{e,a,k}$ and $Y_{o,a,k}$ for the symbol k from symbol samples $Y_{o,k-1}$, $Y_{e,k}$, $Y_{o,k}$, and $Y_{e,k+1}$ so that the sampling delay is reduced from the interval from −T/2 to T/2 to the interval −T/4 to T/4, based on the sampling delay estimate $\hat{\tau}_0$ established by the timing recovery method, in accordance with the following equations:

$$y_{e,a,k} = \begin{cases} y_{o,k-1} & \hat{\tau}_0 > T/4 \\ y_{e,k} & |\hat{\tau}_0| \leq T/4 \\ y_{o,k} & \hat{\tau}_0 < -T/4 \end{cases} \quad (29)$$

$$y_{o,a,k} = \begin{cases} y_{e,k} & \hat{\tau}_0 > T/4 \\ y_{o,k} & |\hat{\tau}_0| \leq T/4 \\ y_{e,k+1} & \hat{\tau}_0 < -T/4 \end{cases} \quad (30)$$

For each symbol k the delay adjustment unit 44 is supplied with the previous estimated sampling delay $\hat{\tau}_{k-1}$ and produces an adjusted estimate $\hat{\tau}_{a,k}$ in accordance with the following equation:

$$\hat{\tau}_{a,k} = \begin{cases} \hat{\tau}_{k-1} + T/2 & \hat{\tau}_0 > T/4 \\ \hat{\tau}_{k-1} & |\hat{\tau}_0| \leq T/4 \\ \hat{\tau}_{k-1} - T/2 & \hat{\tau}_0 < -T/4 \end{cases} \quad (31)$$

The demodulation unit 40 is supplied with this adjusted sampling delay estimate $\hat{\tau}_{a,k}$, with the value $Q_5$ corresponding to this sampling delay estimate, looked up from the memory in which the calculated values of $Q_5$ have been stored as already described above, with the previous estimate $\hat{A}_{k-1}$ of the complex fading factor, and with the current sample $Y_k$ and the next sample $Y_{k+1}$, and serves to produce estimates $\hat{s}_k$ of the current symbol and $\hat{s}_{k+1}$ of the next symbol in accordance with equation (12) above.

The calculation unit 41 is supplied with these estimates $\hat{s}_k$ and $\hat{s}_{k+1}$ from the unit 40 and with the adjusted samples $Y_{e,a,k}$ and $Y_{o,a,k}$ from the unit 45, and calculates new observation model values $\tilde{y}_{e,k}$, $\tilde{y}_{o,k}$, and $\tilde{y}_{o,k,1}$ in accordance with the above equations (13), (14) and (15) respectively (using the adjusted samples $y_{e,a,k}$ and $y_{o,a,k}$ to replace $y_{e,k}$ and $y_{o,k}$ respectively).

The Kalman filter 42 is supplied with these new observation model values from the unit 41, with the previous estimate $\hat{\Phi}_{k-1}$ of the indirect variable vector, and with a constant K which as described above is used to constitute the constant Kalman filter gains K(1)=K(2)=K(3)=0.08, and operates in accordance with equations (22), (23) and (24) above to produce a new estimate $\hat{\Phi}_k$ of the indirect variable vector, constituted by the indirect variable estimates $\hat{\phi}_k(1)$, $\hat{\phi}_k(2)$, and $\hat{\phi}_k(3)$. This is supplied as an output and to the non-linear transform unit 43, which implements equation (25) above to produce a new sampling delay estimate $\hat{\tau}_k$, and implements equation (26) above to produce as an output a new complex fading factor estimate $\hat{A}_k$. The output estimates $\hat{\Phi}_k$ and $\hat{A}_k$ are used in the next recursion.

The delay adjustment unit 46 is supplied with the sampling delay estimate $\tilde{\tau}_k$ from the unit 43 and produces the output estimated sampling delay $\hat{\tau}_k$ in accordance with the following equation:

$$\hat{\tau}_k = \begin{cases} \tilde{\tau}_k + T/2 & \hat{\tau}_0 > T/4 \\ \tilde{\tau}_k & |\hat{\tau}_0| \leq T/4 \\ \tilde{\tau}_k - T/2 & \hat{\tau}_0 < -T/4 \end{cases} \quad (32)$$

It should be appreciated that the invention can be implemented in a similar manner without the manipulations provided by the adjustment units 44 to 46. In any event, the sequence described above is continued recursively for each symbol k in the received information sequence, so that the estimated sampling delay $\hat{\tau}_k$ is updated throughout this sequence. However, it can be appreciated that this need not necessarily be the case. For example, it would be possible for this sequence to recur only occasionally or conditionally during the information sequence. For example, the updating of estimates in a similar manner could be arranged to recur periodically in each case after a predetermined number of symbols, or conditionally subject to some convenient parameter. It can also be appreciated that the above sequence of updating the estimate $\hat{\Phi}$ from the previous estimates of $\hat{\tau}$ and $\hat{A}$, and updating the estimates of $\hat{\tau}$ and $\hat{A}$ from the estimate $\hat{\Phi}$, can also be carried out repeatedly for a single symbol k to provide increased estimation accuracy.

Timing Recovery Method

As already indicated above, the timing tracking method uses initial estimates $\hat{\Phi}_0$, $\hat{A}_0$, and $\hat{\tau}_0$ to which can be produced by the timing recovery method operating on the sync word which comprises M=14 symbols in an IS-54 system. Several ways in which this can be done are described in the related applications referred to in the introduction. For the sake of completeness of the present specification, one of these ways is described below. However, it should be appreciated that the present invention is not limited to any particular manner of producing initial estimates.

Whereas the previous description relates to the processing of samples of the information sequence which follows the sync word, the following description relates to the processing of samples of the symbols forming the sync word. In this case the indirect variables of a linear vector observation model are estimated according to the maximum-likelihood criterion, and the sampling delay is recovered from the estimated indirect variables. In the following description n is an index of the sync word samples and Un represents the complex fading factor.

Linear Vector Observation Model With $[\ ]^T$ representing the conjugate transpose of the matrix within the square brackets, let the (2M+1)-dimensional observation vector of the samples of the received signal be:

$$Y_n = [y_{2n+1}, y_{2n+2}, \ldots y_{2n+2M}, y_{2n+2M+1}]^T, \quad (33)$$

the (M+1)-dimensional vector of the known symbols of the sync word be:

$$S = [s_0, s_1, \ldots s_{M-1}, s_M]^T, \quad (34)$$

and the (2M+1)-dimensional observation vector of noise samples be:

$$H_n = [\eta_{2n+1}, \eta_{2n+2}, \ldots \eta_{2n+2M}, \eta_{2n+2M+1}]^T, \quad (35)$$

Denoting the impulse response matrix by:

$$G(\tau) = \begin{vmatrix} g(-\tau) & g(-\tau - T) & \ldots & g(-\tau - MT) \\ g(-\tau + T/2) & g(-\tau - T/2) & \ldots & g(-\tau - MT + T/2) \\ g(-\tau + T) & g(-\tau) & \ldots & g(-\tau - (M-1)T) \\ \ldots & \ldots & \ldots & \ldots \\ g(-\tau + MT) & g(-\tau + (M-1)T) & \ldots & g(-\tau) \end{vmatrix}, \quad (36)$$

the observation model can be written in the vector form:

$$Y_n = G(\tau)SU_n + H_n \quad (37)$$

In order to linearize this model, each component $g_{ij}(\tau)$ of the matrix $G(\tau)$ is approximated by a linear combination, plus a constant term, of a function pair $\phi_1(\tau)$ and $\phi_2(\tau)$, so that $$g_{ij}(\tau) \approx a_{1ij}\phi_1(\tau) + a_{2ij}\phi_2(\tau) + a_{3ij}$$

where $a_{1ij}$, $a_{2ij}$, and $a_{3ij}$ are matrix coefficients for matrices $A_1$, $A_2$, and $A_3$ respectively. Then it is possible to make the following approximation for the matrix $G(\tau)$:

$$G(\tau) \approx A_1\phi_1(\tau) + A_2\phi_2(\tau) + A_3 \quad (38)$$

in the interval from $-T/2$ to $T/2$ for the sampling delay $\tau$.

The function pair represented by the pair of equations (39) can be used for this linearization to provide sufficient approximation accuracy:

$$\phi_1(\tau) = \cos(\pi\tau) \quad \phi_2(\tau) = \sin(\pi\tau) \quad (39)$$

Using the approximation in equation (38), the observation model of equation (37) becomes $$Y_n = (A_1\phi_1(\tau) + A_2\phi_2(\tau) + A_3)SU_n + H_n \quad (40)$$

or equivalently:

$$Y_n = A_1SU_n\phi_1 + A_2SU_n\phi_2 + A_3SU_n + H_n \quad (41)$$

If $\Phi_n$ is a variable which is a 3-dimensional complex vector constituted by the transpose of three indirect variables $\phi_{1,n}$, $\phi_{2,n}$, and $\phi_{3,n}$, i.e. $\Phi_n = [\phi_{1,n}, \phi_{2,n}, \phi_{3,n}]^T$, with $\phi_{1,n} = U_n\phi_1$, $\phi_{2,n} = U_n\phi_2$, and $\phi_{3,n} = U_n$, and with B being a known constant matrix $B = [A_1S, A2\ S, A3\ S]$, then equation (41) can be written as:

$$Y_n = B\Phi_n + H_n \quad (42)$$

Estimation of Indirect Variables

If $V_\eta$ is the known correlation matrix of the additive Gaussian noise vector $H_{72}$, then from equation (16) it can be seen that the likelihood function for estimating the indirect variable vector $\Phi_n$ is given by the conditional probability $p(Y_n|\Phi_n)$ (i.e. the probability of $Y_n$ given the condition $\Phi_n$):

$$p(Y_n|\Phi_n) = \frac{\exp(-((Y_n - B\Phi_n)'V_\eta^{-1}(Y_n - B\Phi_n))/2)}{(2\pi)^{M+1/2}det(V_\eta)^{1/2}} \quad (43)$$

The suffix ' indicates the conjugate transpose. Representing estimated values by a circumflex ^, the maximum likelihood estimate $\hat{\Phi}_n$ for the indirect variable vector $\Phi_n$ can be determined to be:

$$\hat{\Phi}_n = CY_n \quad (44)$$

where $C = (B'V_\eta^{-1}B)^{-1}B'V_\eta^{-1}$ is a 3×(2M+1) matrix that can be calculated from B and $V_\eta$ (both of which are known) and stored in a look-up table in memory.

The next step is to recover the sampling delay $\tau$ from the estimate $\hat{\Phi}_n$.

Recovery of Sampling Delay

From equation (43), a new observation equation for indirect variables can be derived:

$$\hat{\Phi}_n = \Phi_n + \Gamma_n \quad (45)$$

where $\Gamma_n$ is a 3-dimensional vector of complex Gaussian random variables with known correlation matrix $V_\gamma = (B'V_\eta^{-1}B)^{-1}$. Equation (45) can be written in the form:

$$\hat{\Phi}_n = F(\tau)U_n + \Gamma_n \quad (46)$$

where $F(\tau) = [\phi_1(\tau), \phi_2(\tau), 1]^T$. The observation noise in equation (46) is Gaussian, so that the likelihood function of the observation can be obtained as:

$$p(\hat{\Phi}_n | U_n, \tau) = \frac{\exp(-((\hat{\Phi}_n - F(\tau)U_n)'V_\gamma^{-1}(\hat{\Phi}_n - F(\tau)U_n))/2)}{(2\pi)^{3/2} det(V_\gamma)^{1/2}} \quad (47)$$

and averaged over the complex variable $U_n$ to determine an equation for the likelihood function with respect to $\tau$:

$$p(\hat{\Phi}_n | \tau) = \frac{\exp(-(\hat{\Phi}'_n V_\gamma^{-1} F(\tau)(F(\tau)'V_\gamma^{-1}F(\tau))^{-1}F(\tau)'V_\gamma^{-1}\hat{\Phi}_n)/2)}{(2\pi)det(V_\gamma)^{1/2}det(F(\tau)'V_\gamma^{-1}F(\tau))D(\hat{\Phi}_n)} \quad (48)$$

where $$D(\hat{\Phi}_n) = \exp\left(\frac{1}{2}\hat{\Phi}'_n V_\gamma^{-1} \hat{\Phi}_n\right).$$

A recursive estimation procedure for the sampling delay is based on a maximization of the likelihood function with respect to variables $\phi_1$, $\phi_2$, and $U_n$, first considering the maximum likelihood estimation for the variables $\phi_1$ and $\phi_2$ with the assumption that $U_n$ is known, and then considering the estimation of $U_n$ with the assumption that the sampling delay $\tau$ is known.

In the first case, the following likelihood function can be derived from equation (47):

$$p(\hat{\phi}_{1,n}, \hat{\phi}_{2,n} | \phi_1, \phi_2) \approx \quad (49)$$

$$\exp\left(-\frac{1}{2}\left(\left|\begin{matrix}\mu_{1,n}\\\mu_{2,n}\end{matrix}\right| - \left|\begin{matrix}\phi_1\\\phi_2\end{matrix}\right|\right)V_{\phi,n}^{-1}\left(\left|\begin{matrix}\mu_{1,n}\\\mu_{2,n}\end{matrix}\right| - \left|\begin{matrix}\phi_1\\\phi_2\end{matrix}\right|\right)\right)$$

with $$V_{\phi,n} = \left(\frac{1}{|U_n|^2}\right)\left|\begin{matrix}V_{\gamma 11} - |V_{\gamma 13}|^2/V_{\gamma 33} & 0\\ 0 & V_{\gamma 22}\end{matrix}\right|,$$

$$\mu_{1,n} = \hat{\phi}_{1,n}U_n^{-1} - c_\gamma(\hat{\phi}_{3,n} - U_n)U_n^{-1}, \text{ and } \mu_{2,n} = \hat{\phi}_{2,n}U_n^{-1}$$

where $V_{\gamma ij}$ are elements of the matrix $V_\gamma$ and $C_\gamma = V_{\gamma 13}/V_{\gamma 33}$. In the derivation it is assumed that $V_{\gamma 12} = V_{\gamma 21} = V_{\gamma 23} = V_{\gamma 32} = 0$.

From equation (49) it follows that $\hat{\phi}_{1,n} = \mu_{1,n}$ and $\hat{\phi}_{2,n} = \mu_{2,n}$, and the estimated sampling delay is given by the following non-linear transformation:

$$\hat{\tau}_n = f\left(a\tan\left(\frac{real(\hat{\phi}_{2,n})}{real(\hat{\phi}_{1,n})}\right)\right) \quad (50)$$

In the second case, from equation (47) the likelihood function for $U_n$ assuming that the sampling delay $\tau$ is known can be derived as:

$$p(\hat{\phi}_{1,n}, \hat{\phi}_{2,n} | U_n) \approx \exp\left(-\frac{1}{2}(W_n - Un)'V_u^{-1}(W_n - U_n)\right) \quad (51)$$

where $V_u = (F(\tau)'V_\gamma^{-1}$ and $W_n = (F(\tau)'V_\gamma^{-1}F(\tau))^{-1}F(\tau)'V_\gamma^{-1}\Phi_n$, from which it follows that the estimate $\hat{U}_n = W_n$.

The recursive procedure is then summarized as comprising the following four sequential steps for each iteration k:

Step 1

Initial estimation of the sampling delay in accordance with equation (52):

$$\hat{\tau}_n^{k=0} = f\left(a\tan\left(real\frac{(\hat{\phi}_{2,n})}{(\hat{\phi}_{1,n})}\right)\right) = f\left(a\tan\left(\frac{real(\hat{\phi}_{2,n}\hat{\phi}_{1,n}')}{|\hat{\phi}_{1,n}|^2}\right)\right) \quad (52)$$

Step 2

Estimation of the fading factor in accordance with equation (53):

$$\hat{U}_n^k = (F(\hat{\tau}_n^k)'V_\gamma^J F(\hat{\tau}_n^k))^{-1} F(\hat{\tau}_n^k)'V_\gamma^J \hat{\Phi}_n \quad (53)$$

Step 3

Re-estimation of the sampling delay in accordance with equation (54):

$$\hat{\tau}_n^{k+1} = f\left(a\tan\left(real\frac{(\hat{\phi}_{2,n})}{(\hat{\phi}_{1,n} - c_\gamma(\hat{\phi}_{3,n} - \hat{U}_n^k))}\right)\right) \quad (54)$$

Step 4

Stop if a predetermined maximum number of iterations has been reached, otherwise return to Step 2.

Figure 3:
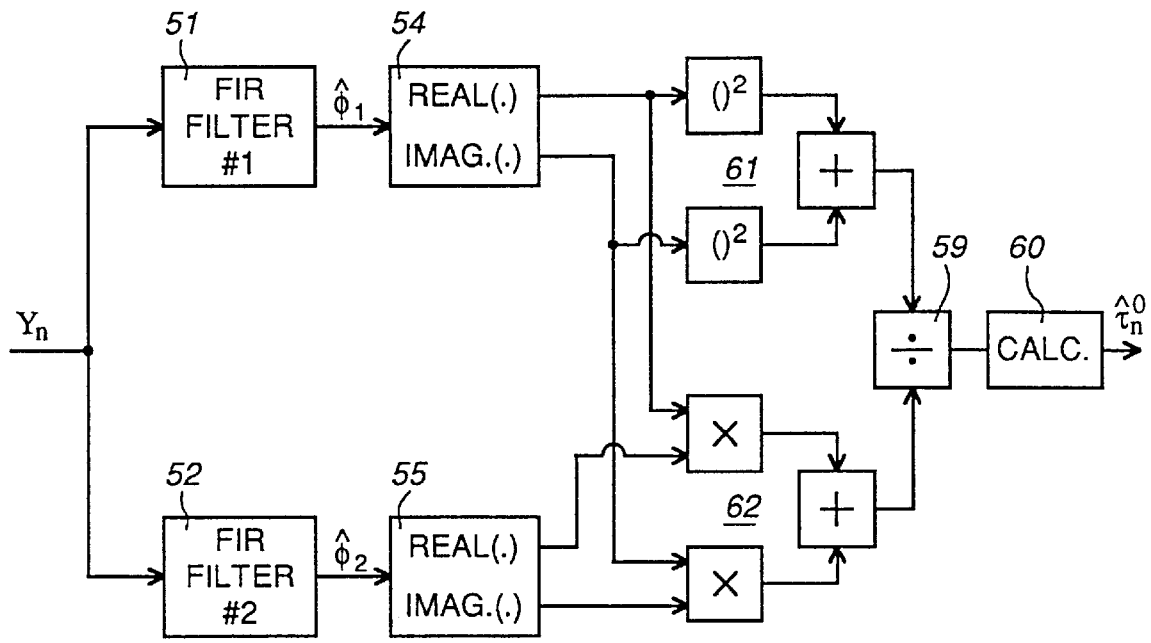
FIGS. 3 and 4 schematically illustrate a timing recovery arrangement which can be used for producing initial estimates for use by the arrangement of FIG. 2.

An implementation of this is described below with reference to FIG. 4. FIG. 3 illustrates an implementation of Step 1 of this procedure, in which the sampling delay estimation is given by:

$$\left|\begin{matrix}\hat{\phi}_{1,n}\\\hat{\phi}_{2,n}\end{matrix}\right| = \left|\begin{matrix}C_1\\C_2\end{matrix}\right| Y_n, \quad \hat{\tau}_n = \frac{1}{\pi}\left(a\tan\left(\frac{real(\hat{\phi}_{2,n}\hat{\phi}_{1,n}')}{|\hat{\phi}_{1,n}|^2}\right)\right) \quad (55)$$

where $C_i$ is the i-th element of the known matrix C.

Referring to FIG. 3, illustrating a block circuit diagram of an implementation of timing recovery parts of the block 32 for producing the estimated sampling delay $\hat{\tau}_n$ from the received signal samples $Y_n$ in accordance with the above Step 1, the signal samples $Y_n$ are supplied to two FIR filters 51 and 52 for producing the indirect variable estimates $\hat{\phi}_1$ and $\hat{\phi}_2$ respectively in accordance with equation (44). The real and imaginary parts of these estimates are separated by units 54 and 55 respectively and are used by the remainder of the circuit of FIG. 3 to implement the function of equation (55). This part of the circuit comprises a complex squarer 61 (comprising two squarers and an adder) and a complex multiplier 62 (comprising two multipliers and an adder), arranged to produce respectively the denominator and the numerator in equation (55), a divider 59 arranged to perform the division of the numerator by the denominator, and a calculation unit 60 arranged to perform the function $(1/\pi)$ atan() of equation (55) and hence to produce an initial estimated sampling delay $\hat{\tau}_n^0$.

Figure 4:
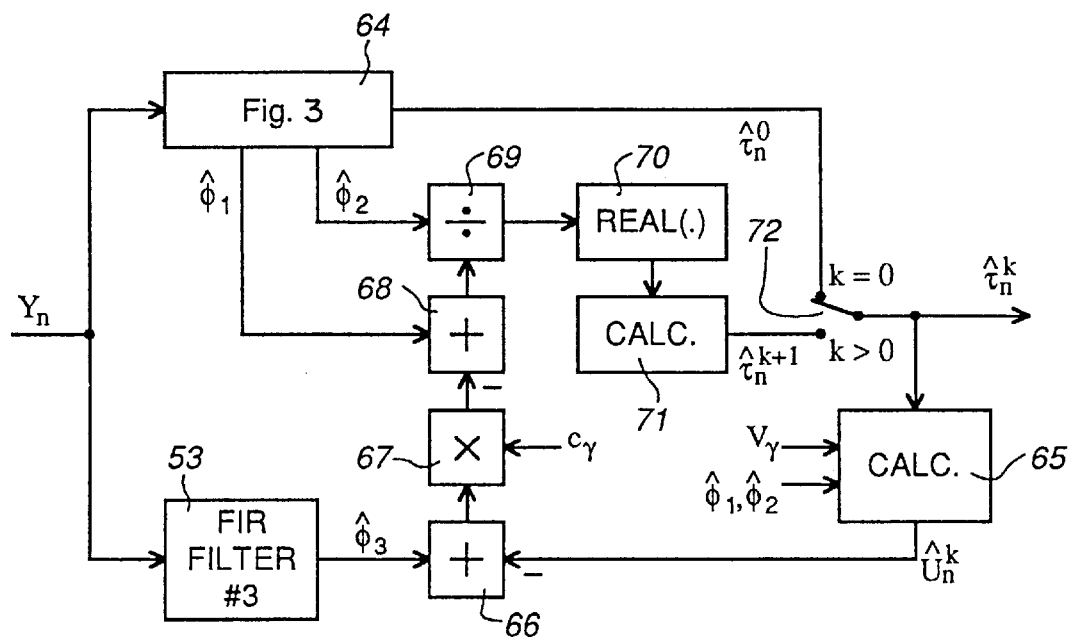

FIG. 4 illustrates a block circuit diagram of an implementation of the remainder of the timing recovery parts of the block 32, incorporating the circuit of FIG. 3, shown as a unit 64, for producing the indirect variable estimates $\hat{\phi}_1$ and $\hat{\phi}_2$ and the estimated sampling delay $\hat{\tau}_n^0$ (for which a count k=0). The circuit of FIG. 4 also includes an FIR filter 53 arranged to produce the indirect variable estimate $\hat{\phi}_3$ from the received signal samples $Y_n$, and units 65 to 71 and a switch 72 whose functions are described below.

Step 1 of the recursive procedure is carried out by the unit 64 as described above to provide the initial estimated sampling delay for k=0, thereby implementing equation (52) (or (55)), the switch 72 being in the position shown to supply this estimate to the output and to the calculation unit 65. The calculation unit 65 is also supplied with the indirect variable estimates $\hat{\phi}_1$ and $\hat{\phi}_2$ and the matrix $V_\gamma$, and calculates the estimate $\hat{U}_n$ (Step 2 of the recursive procedure) in accordance with equation (53). The units 66 to 71 implement equation (54), corresponding to Step 3 of the recursive procedure, to produce the estimated sampling delay for the next-higher value of k, for which k>0 so that as indicated in FIG. 4 the switch 72 is moved to its other position to provide the new estimated sampling delay to the output and to the calculation unit 65.

As can be appreciated from FIG. 4 and equation (54), the unit 66 is an adder, with a subtraction input, which performs the subtraction in brackets in the denominator of equation (54), the difference is multiplied by $c_\gamma$ in the multiplier unit 67 and the product is subtracted from $\hat{\phi}_1$ in the adder unit 68 to produce the denominator in equation (54). The unit 69 is a divider which performs the division in equation (54), the unit 70 provides the real part of the division result, and the unit 71 is a calculation unit which performs the function $(1/\pi)$atan(). It can be appreciated that the calculation units 71 and 60 (in the unit 64) can be constituted by a single unit by interchanging the positions of these units and the switch 72.

This timing recovery recursive procedure is applied for each sample n of the sync word, at the end of which the estimates $\hat{\Phi}_n$ (constituted by $\hat{\phi}_{1,n}$, $\hat{\phi}_{2,n}$, and $\hat{\phi}_{3,n}$), $\hat{U}_n$, and $\hat{\tau}_n$ are used to constitute the initial estimates $\hat{\Phi}_0$ (constituted by $\hat{\phi}_0(1)$, $\hat{\phi}_0(2)$, and $\hat{\phi}_0(3)$), $\hat{A}_0$, and $\hat{\tau}_0$ respectively for the timing tracking method.

Although particular embodiments of the invention have been described in detail, it should be appreciated that numerous modifications, variations, and adaptations may be made without departing from the scope of the invention as defined in the claims.

What is claimed is:

1. A method of tracking a sampling delay for samples of an information sequence in a received communications signal, comprising the steps of, recursively:

providing a current estimate of indirect variables of a linear complex vector, which approximates received signal samples, from received samples and previous estimates of the indirect variables, the sampling delay, and a complex fading factor; and providing current estimates of the complex fading factor and of the sampling delay by performing respective non-linear transformations of the current estimate of the indirect variables.

2. A method as claimed in claim 1 wherein the step of providing the current estimate of the indirect variables comprises the steps of:

demodulating received samples in dependence upon the previous estimate of the complex fading factor and a stored vector dependent upon the previous estimate of the sampling delay, to produce estimated symbols of the information sequence;

modifying the received samples in dependence upon the estimated symbols to produce modified samples; and Kalman filtering the modified samples to produce the current estimate of the indirect variables.

3. A method as claimed in claim 2 wherein the step of Kalman filtering comprises filtering using a one-dimensional Kalman filter having constant filter gains.

4. A method as claimed in claim 1 wherein the steps of providing the current estimate of the indirect variables and providing current estimates of the complex fading factor and of the sampling delay are performed once for each symbol of the information sequence.

5. A method as claimed in claim 1 and further including the step of transforming the received samples and the estimates of the sampling delay from an interval from $-T/2$ to $T/2$ to an interval from $-T/4$ to $T/4$, where T is a symbol spacing of the information sequence, wherein the current estimates are provided with the sampling delay reduced to the interval from $-T/4$ to $T/4$.

6. Apparatus for tracking a sampling delay for sampling an information sequence in a received communications signal, comprising:

a demodulator, responsive to received signal samples and to estimates of the sampling delay and a complex fading factor of the received communications signal, to estimate symbols of the information sequence;

a calculation unit responsive to the estimated symbols to update an observation model for the received communications signal;

a Kalman filter responsive to the observation model to update an estimated linear complex vector which approximates the received signal samples; and a non-linear transform unit responsive to the estimated linear complex vector to produce updated estimates of the sampling delay and complex fading factor for use recursively by the demodulator.

7. Apparatus as claimed in claim 6 wherein the Kalman filter has constant filter gains.

8. Apparatus as claimed in claim 6 and further including adjustment units for transforming the received signal samples and the estimated sampling delay from an interval from $-T/2$ to $T/2$ to an interval from $-T/4$ to $T/4$, where T is a symbol spacing of the information sequence.

9. Apparatus as claimed in claim 6 wherein the demodulator, calculation unit, Kalman filter, and non-linear transform unit are constituted by functions of at least one digital signal processor.

* * * * *